United States Patent
Austinat et al.

(10) Patent No.: US 9,541,068 B2
(45) Date of Patent: Jan. 10, 2017

(54) METHOD, PREFABRICATED STRUCTURAL ELEMENT AND MOLD FOR MAKING A WIND TURBINE MEMBER

(71) Applicant: Nordex Energy GmbH, Hamburg (DE)

(72) Inventors: Dirk Austinat, Jarmen (DE); Marco Frankowski, Osteebad Wustrom (DE)

(73) Assignee: Nordex Energy GmbH, Hamburg (DE)

(*) Notice: Subject to any disclaimer, the term of this patent is extended or adjusted under 35 U.S.C. 154(b) by 652 days.

(21) Appl. No.: 13/886,038

(22) Filed: May 2, 2013

(65) Prior Publication Data

US 2013/0292885 A1 Nov. 7, 2013

(30) Foreign Application Priority Data

May 7, 2012 (EP) .................................. 12003602

(51) Int. Cl.
  *B29C 70/68* (2006.01)
  *F03D 11/00* (2006.01)
  *F03D 1/06* (2006.01)
  *B29C 33/14* (2006.01)

(52) U.S. Cl.
  CPC .............. *F03D 11/00* (2013.01); *B29C 70/68* (2013.01); *F03D 1/0675* (2013.01); *B29C 33/14* (2013.01); *Y02E 10/721* (2013.01); *Y02P 70/523* (2015.11); *Y10T 428/24479* (2015.01); *Y10T 428/24612* (2015.01)

(58) Field of Classification Search
  CPC ...................................................... B29C 70/68
  See application file for complete search history.

(56) References Cited

U.S. PATENT DOCUMENTS

| 4,897,514 A * | 1/1990 | Arima ..................... H02G 3/16 |
| | | 200/19.32 |
| 9,199,301 B2 * | 12/2015 | Rajasingam ............ B29C 33/12 |
| 2011/0030183 A1 | 2/2011 | Livingston et al. |
| 2012/0107129 A1 | 5/2012 | Kulenkampff et al. |
| 2013/0239379 A1 * | 9/2013 | Rajasingam ............ B29C 33/12 |
| | | 29/23.51 |
| 2013/0334735 A1 | 12/2013 | Casazza et al. |

FOREIGN PATENT DOCUMENTS

| IN | WO 2012042506 A2 * | 4/2012 | ........... B29C 70/443 |
| WO | WO 2012/019610 A1 | 2/2012 | |
| WO | WO 2012/028615 A2 | 3/2012 | |

* cited by examiner

*Primary Examiner* — Ryan Ochylski
(74) *Attorney, Agent, or Firm* — Walter Ottesen, P.A.

(57) ABSTRACT

A method for making a wind turbine member wherein a plurality Of components are arranged in a mold. The inner side of the mold determines a surface of the wind turbine member. The components are connected to one another. At least one of the components is a prefabricated structural element which has a fixed geometry with an outer surface. The prefabricated structural element has a positioning projection protruding out of the outer surface and the mold has, on its inner side, a positioning receptacle. The positioning projection is inserted positively into the positioning receptacle to determine the disposition of the prefabricated structural element in the mold.

6 Claims, 2 Drawing Sheets

METHOD, PREFABRICATED STRUCTURAL ELEMENT AND MOLD FOR MAKING A WIND TURBINE MEMBER

CROSS REFERENCE TO RELATED APPLICATION

This application claims priority of European patent application no. 12003602.5, filed May 7, 2012, the entire content of which is incorporated herein by reference.

FIELD OF THE INVENTION

The invention relates to a method for making a wind turbine member, in which a plurality of components are arranged in a mold, the inner side of which predefines a surface of the wind turbine member, and are connected to one another. At least one of the components is a prefabricated structural element which has a fixed geometry with an outer surface. The invention, moreover, relates to such a prefabricated structural element and to a mold for making such a wind turbine member.

BACKGROUND OF THE INVENTION

Wind turbine members of he type in question here are often made from fiber-reinforced plastics materials. This applies particularly to the rotor blades. Molds, into which suitable fibrous materials are arranged, are used for this purpose. The fibrous materials are embedded into a plastics material which cures in the mold. It has also become known to use prefabricated structural elements. These can, for example be elements of a carrying structure for the wind turbine member, such as, for example, ribs or spars of a wind turbine rotor blade or elements of the rotor blade shell. The elements can be prefabricated in special molds likewise from fiber-reinforced plastics. As a result the use of prefabricated structural elements, process reliability, particularly in the drive of complex wind turbine members, can be improved.

In order to ensure the dimensional accuracy even in members with complex geometry, it has become known to arrange the prefabricated structural element and further components for the wind turbine member in a mold and to connect them to one another in the mold. For this purpose, the prefabricated structural element and the further components have to be positioned exactly in relation to one another and in relation to the mold, irrespective of whether they are further prefabricated elements or components for the wind turbine member which are produced only in the mold.

A method and a device for assembling a wind turbine rotor blade was disclosed in the publication: U.S. patent application publication 2011/0030185 A1. The device includes a stationary frame in which a nose side section of the rotor blade is fixed. An end edge-side section of the rotor blade is fixed in a jig fixture which is subsequently oriented in relation to the frame. The sections are fixed to the frame or the jig fixture with the aid of suction cups. The various prefabricated rotor blade sections are then adhesively bonded to one another. In order in this case to orient them exactly in relation to one another, the arrangement of the respective member in the frame or in the jig fixture can be adjusted.

A method and a device for the production of a wind turbine rotor blade is disclosed in the publication WO 2012/019610 A1 in the known method, a prefabricated end edge is arranged between the trailing edges of a pressure-side and a suction-side rotor blade half shell and is adhesively bonded to these. In this the two half shells are still located in the molds used for producing them. The prefabricated end edge is fastened to a holding fixture by means of clamps or suction cups. The bolding fixture is connected to one of the production molds, wherein the exact positioning of the prefabricated end edge in relation to the half shells carried out by adjusting the position of the holding fixture with respect to the mold.

SUMMARY OF THE INVENTION

It is an object of the invention to provide a method of the type described above, via which the prefabricated structural element can be positioned in the mold simply and, exactly, as well as a prefabricated structural element suitable for this purpose and a mold suitable for this purpose.

The method serves for the production of a wind turbine member. In the method, a plurality of components are arranged in a mold, the inner side of which predefine a surface of the wind turbine member, and are connect one another, at least one of the components being a prefabricated structural element which has a fixed geometry with an outer surface. The prefabricated structural element has a positioning projection protruding out of the outer surface and the mold has on its inner side a positioning receptacle, the positioning projection being inserted positively into the positioning receptacle in order to predefine the arrangement of the prefabricated structural element in the mold.

The wind turbine member can, for example, be a rotor blade or a rotor blade half shell. The prefabricated structural element can be any component of the wind turbine member to be produced which is to be arranged in the mold, for example an element of a carrying structure, such as a trailing edge spar, a reinforcing element for a leading edge of the wind turbine member or a rotor blade trailing edge. The prefabricated structural element has its fixed geometry even before it is arranged in the mold.

The positioning projection can, for example, be a positioning tenon, a positioning rib or another projection which can interact in the desired way with the positioning receptacle which can have a complementarily formed geometry. The positioning projection is located in a defined position in relation to the prefabricated structural element, so that exact positioning of the entire structural element is possible with the aid of the positioning projection. For this purpose, the prefabricated structural element can be produced in one part with the positioning projection.

The mold has a positioning receptacle which is likewise located in a defined arrangement in relation to the mold. The positioning projection is inserted positively into the positioning receptacle, that is to say, after insertion, a relative movement between the positioning projection and the positioning receptacle is prevented in at least one direction of movement by mutually abutting faces of the positioning project on and positioning receptacle. Preferably, such relative movement is prevented in at least two spatial directions arranged perpendicularly to one another or in all spatial directions, if appropriate with the exception of a single direction of move which is opposite to the direction when the positioning projection is being inserted into the positioning receptacle. As a result, after the insertion of the positioning projection into the positioning receptacle, prefabricated structural element is in its intended arrange in relation to the mold. The positioning projection and positioning receptacle can simultaneously hold the prefabricated structural element in this assembly position. Alternatively or additionally, the prefabricated structural element can bear against an inner side of the mold, so that the holding function is performed only partially by the positioning projection and positioning receptacle.

When the positioning projection is being inserted into the positioning receptacle, the positioning projection can, in particular, be pushed into the positioning receptacle along a predefined direction of insertion. This direction of insertion can, in particular, run along a section of the inner side of the mold, the section being adjacent to the prefabricated structural element.

It is understood that the prefabricated structural element can have a multiplicity of positioning projections and the mold a corresponding or larger number of positioning receptacles, in order to ensure the exact positioning of the prefabricated structural element at a plurality of spaced-apart locations and so that, if appropriate, the required holding forces can be applied. If a multiplicity of positioning projections and positioning receptacles are used, the directions of insertion of all the positioning projections and positioning receptacles are preferably oriented parallel to one another. The prefabricated structural element can then be inserted into the mold in a single translational movement.

The arrangement of the prefabricated structural element in the mold may take place before or after further components of the wind turbine member are arranged in the mold. It is also possible to arrange some of the further components in the mold before the prefabricated structural element and others of the further components after the prefabricated structural element, so that the prefabricated structural element and the further components can overlap one another in the desired way, if appropriate even multiple times.

By virtue of the invention, the exact positioning of the prefabricated structural element in the mold is simplified considerably. It is not necessary to fasten additional fastening devices, such as, for example, clamps or suction cups, to the prefabricated structural element. There is likewise no need for manual adjustment of the prefabricated structural element in relation to the mold. Measurement in order to check the exact positioning also does not have to be carried out. Another advantage is that the further method steps are not impeded by separate fastening devices.

In one embodiment, the positioning projection is removed after the connection of the components and the extraction of the finished wind turbine member from the mold. For this purpose, it can, for example, be cut off, knocked off, sawn off or separated from the prefabricated structural element in another way. After connection of the components, the positioning projection is no longer required. By the positioning projection being removed, the wind turbine member acquires its intended geometry. Since the positioning projection protrudes from the outer surface of the prefabricated structural element, the removal of the positioning projection does not leave behind any gap in the prefabricated structural element, the structural integrity of the wind turbine member is not impaired.

In one embodiment, in the predefined arrangement the prefabricated structural element bears with the outer surface against the inner side of the mold. In other words, the outer surface forms part of the surface of the wind turbine member. What is achieved by bearing against the inner side of the mold is that the surface of the finished member corresponds exactly the intended geometry even in the region of the prefabricated structural element.

In one embodiment, a further component has a fibrous material. The further component is connected to the prefabricated structural element in the method. The fibrous material of the further component can be embedded into a plastics matrix. The plastics matrix having fibrous material can be cured even when the method is being implemented. It is likewise possible to use a plastics matrix which is still liquid when the method is being implemented and which cures when the components are connected in the mold.

In one embodiment, the fibrous material is arranged in the mold such that the fibrous material adjoins an inner side of the prefabricated structural element. This results in a connection of this prefabricated structural element to the further component over a large area. It is likewise possible that the fibrous material or the further component touches the prefabricated. structural element on at least two sides and/or sometimes even surrounds it on all sides, if appropriate with the exception of the positioning projection. The inner side can, in particular, lie opposite the outer surface of the prefabricated structural element.

In one embodiment, the mold with the components arranged in it, including the prefabricated structural element, is closed by a vacuum envelope, and a liquid plastics material in the mold. The liquid plastics material may be introduced into the mold by means of a vacuum infusion method. It is likewise possible to use what are known as prepregs, that is to say fibrous materials already impregnated with the liquid plastics material before being arranged in the mold. By means of the vacuum envelope, a vacuum can be generated in the mold, on the one hand for vacuum infusion and, on the other hand, when prepregs are used, for compressing the components contained in the mold and for pressing them against the inner side of the mold. The use of a vacuum envelope is appreciably simplified by the positioning projections and positioning receptacles because special precautions do not have to be taken for sealing off the mold, in conjunction with separate fastening devices for the prefabricated structural element. In the invention, the use of a vacuum envelope is possible just as easily as in conventional production methods for wind turbine members which manage without prefabricated structural elements.

In one embodiment, the prefabricated structural element and/or the mold are/is designed according to one of the embodiments described below.

the prefabricated structural element for the production of a wind, turbine member in a mold, the inner side of which predefines a surface of the wind turbine member. The prefabricated structural element has a fixed geometry with an outer surface and a positioning projection which protrudes out of the outer surface and is intended to be inserted positively into a positioning receptacle of the mold in order to predefine the arrangement of the prefabricated structural element in the mold.

In regards to the features of the structural element and in regards to the particular advantages, reference is made to the above descriptions of the method according to the invention which apply correspondingly.

In one embodiment, the positioning projection has an undercut. The positioning projection can, in particular, have a dovetail-shaped form. A width of the positioning projection can become larger with an increase in distance from the outer surface of the prefabricated structural element. As a result of such an undercut, the connection of the positioning projection and of the positioning receptacle can not only predefine a lateral arrangement of the prefabricated structural element, but also absorb tensile forces and thus position and/or hold the prefabricated structural element in the desired arrangement even better.

In one embodiment, the cross section of the positioning projection in the plane of the outer surface, in a first direction, has a maximum length and, perpendicularly thereto, a width, the width amounting to a maximum of 20 mm or a maximum of 10 mm. For example, the positioning projection may have an elongate form, in particular rectangular form, in the cross-sectional plane. A triangular or trapezoidal cross-sectional area is also possible. The maximum length extends in the longitudinal direction of the cross section and can have a greater length of, for example, more than 5 cm, more than 10 cm, more than 20 cm or more than 30 cm. Since the width, measured perpendicularly to this maximum length, does not exceed the maximum length, the separation of the positioning projection from the prefabricated structural element is simplified. Even when the width is very small, sufficient stability of the positioning projection can be achieved by a correspondingly greater maximum length.

In one embodiment, the prefabricated structural element has reinforcing fibers embedded into a plastics matrix and is formed in one part with the positioning projection. For this purpose, the prefabricated structural element including the positioning projection, can be produced in a separate mold, in particular by a vacuum infusion method. This separate mold then has a cutout complementary to the positioning projection, so that during vacuum infusion, the positioning projection is automatically filled with the liquid plastics material. An exact arrangement of the positioning projection on the prefabricated structural element is thereby ensured. The reinforcing fibers can be arranged such that the positioning projection has no reinforcing fibers. It can then be removed in an especially simple manner, for example by being knocked off. Particularly in conjunction with the fact that the cross section of the positioning projection in the plane of the outer surface of the prefabricated structural element adheres to the abovementioned maximum width, during vacuum infusion the situation can be avoided where reinforcing fibers arranged in the separate mold pass into the region of the positioning projection. All advantageous arrangement of the reinforcing fibers in the prefabricated structural element is thereby achieved.

In one embodiment, the positioning projection is separated from the rest of the prefabricated structural element in the plane of the outer surface by a tear-off fabric and/or by a rigid liquid-permeable layer. By virtue of these measures, on the one hand, simple removal of the positioning projection is assisted and, on the other hand, the rigid liquid-permeable layer avoids a situation where reinforcing fibers pass into the region of the positioning projection.

The mold serves for the production of a wind turbine member. It has an inner side, which predefines a surface of the wind turbine member, and, on the inner side, a positioning receptacle which is intended for the positive reception of a positioning projection of a prefabricated structural element of the wind turbine member in order to predefine the arrangement of the prefabricated structural element in the mold.

In regards to the features and advantages of the mold, reference is made to the above descriptions of the method and at the prefabricated structural element which apply correspondingly. In one embodiment, the positioning receptacle has a groove. The groove can, in particular, have a section which is complementary to a cross section of the positioning projection in a corresponding sectional plane. In particular, the groove can be of dovetail-shaped form, that is to say trapezoidal in cross section, the longer base side of the trapezium being arranged inside the positioning receptacle.

In one embodiment, the positioning receptacle is designed as an insert fastened exchangeably in a cutout of the mold. The insert can, for example, be made of a silicone or of a material having PTFE (polytetrafluoroethylene). The insert can be of block-shaped or cube-shaped form. The insert may have a surface which faces the inner side of the mold and which forms a section of the inner side of the mold. The insert can be adhesively bonded into the cutout of the mold or be fastened therein in another way. The use of such an insert makes it possible to repair the mold in a simple way, should a positioning receptacle be damaged, for example after multiple use. In this case, the insert, together with the damaged positioning receptacle, can be separated from the mold and replaced by a new insert.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
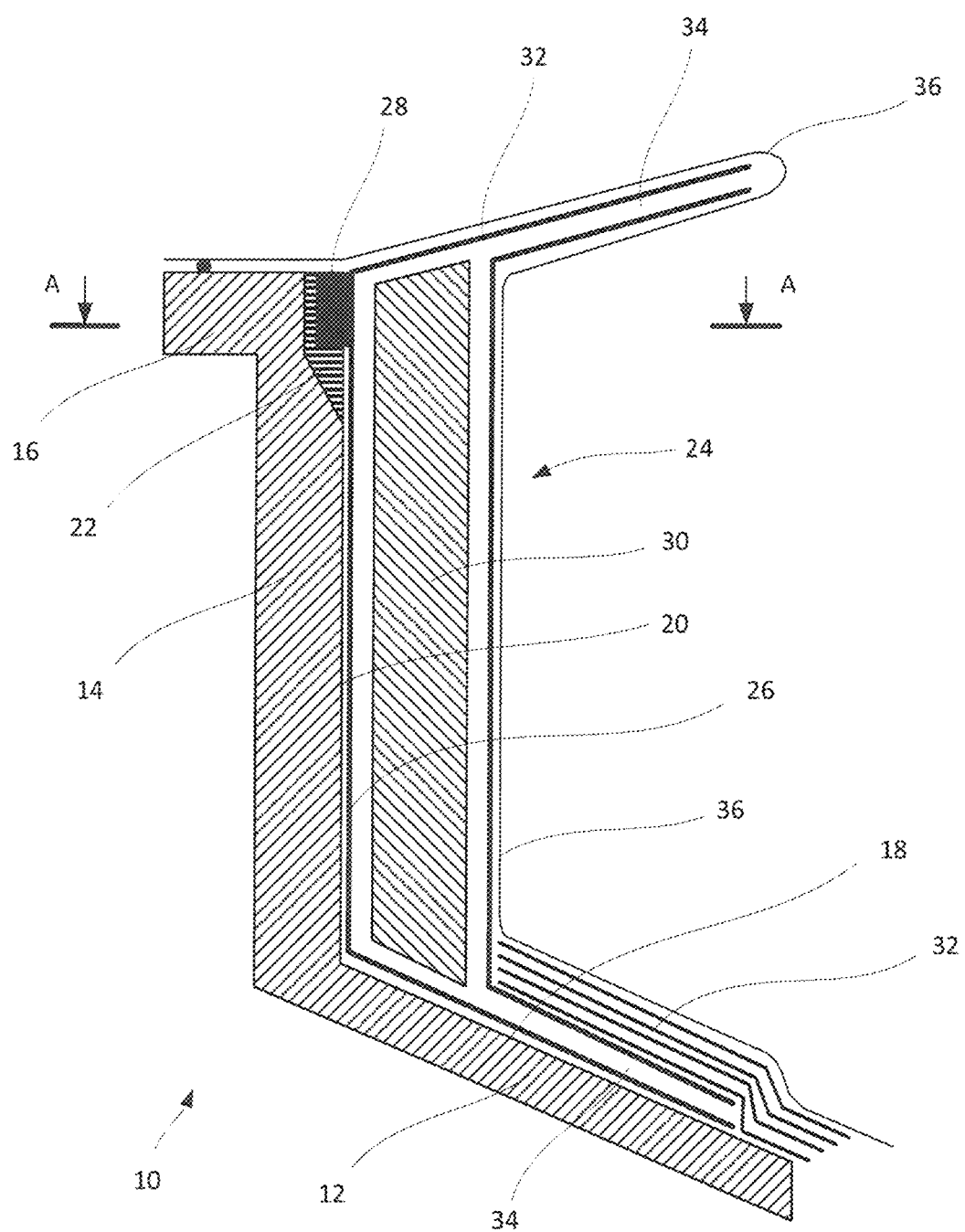
FIG. 1 is a schematic of the arrangement of a prefabricated structural element in a mold in cross section.

FIG. 1 shows a mold for the production of suction-side wind turbine rotor blade half shell. The mold 10 has a suction side section 12 and a trailing edge section 14 which adjoins the latter and which is arranged essentially perpendicularly. The mold 10 also has an edge 16.

Corresponding to the suction side section 12 and the trailing edge section 14, the mold 10 has a first inner side section 18, which determines the surface of the suction side of the rotor blade, and a second inner side section 20, which determines the surface of the trailing edge of the rotor blade.

On the inner side of the mold 10, more specifically on the second inner side section 20, the mold 10 has a positioning receptacle 22. This is located in an upper region of the trailing edge section 14 of the mold 10.

Located in the mold 10 is a prefabricated structural element 24 for what is known as a blunt trailing edge with a sandwich structure, the structural element having a fixed geometry with an outer surface 26. The outer surface 26 bears against the second inner side section 20 of the mold 10. Moreover, the prefabricated structural element 24 has a positioning projection 28 which, in FIG. 1, is already inserted into the positioning receptacle 22. For this purpose, the prefabricated structural element 24 has been pushed with the positioning projection 28 into the positioning receptacle 22 from above.

The structural element 24 prefabricated in a sandwich type of construction has a core 30, for example made from a foamed material or from balsa wood, and a fibrous material 32 which surrounds this core 30 and whist is embedded into an already cured plastics matrix. The prefabricated structural element 24 has been produced in a separate production mold by a vacuum infusion method, the core 30 having been embedded into the fibrous material 32, surrounding the core 30 on all four sides shown in FIG. 2, and the positioning projection 28 having been formed simultaneously.

The further components of the wind turbine member are indicated in FIG, 1. What can be seen are further layers of a fibrous material 32 which bear against the first inner side section 18 of the mold 10 and form the suction side of the wind turbine rotor blade in the method, these further layers of fibrous material 32 are connected to fastening sections 34 of the prefabricated structural element 24 which protrude in 4 flange manner. For this purpose, the fibrous material 32 forming the suction side can be introduced, in particular dry, into the mold 10. The prefabricated structural element 24 has already previously been arranged in the mold 10 in the manner described. The mold 10 is subsequently closed by means of a vacuum envelope 36, for example in the form of a vacuum film, and the fibrous material 32 forming the suction side is impregnated by a vacuum infusion method with a liquid plastics material which subsequently cures in the mold 10.

Figure 2:
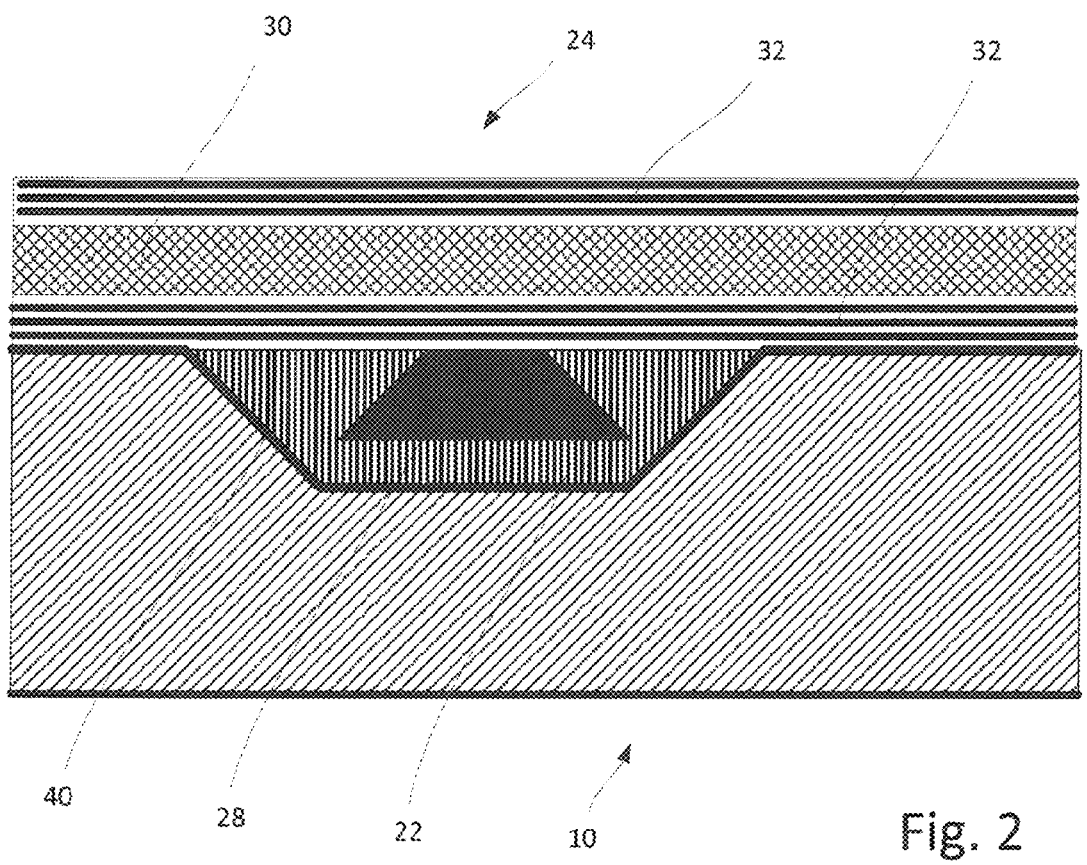
FIG. 2 is a top view of the arrangement of FIG. 1.

A cross section along the plate designated in FIG. 1 by A-A is shown in FIG. 2. What can be seen are the sandwich structure of the prefabricated structural element 24 with the core 30 and the layers of fibrous material 32 which are arranged on both sides thereof. The positioning projection 28 having a dovetail-shaped cross section can be seen clearly. The complementarily formed positioning receptacle 22 in the mold 10 is made of PTFE, is trapezoidal in cross section and is glued into a complementarily formed cutout 40 in the mold 10.

Figure 3:
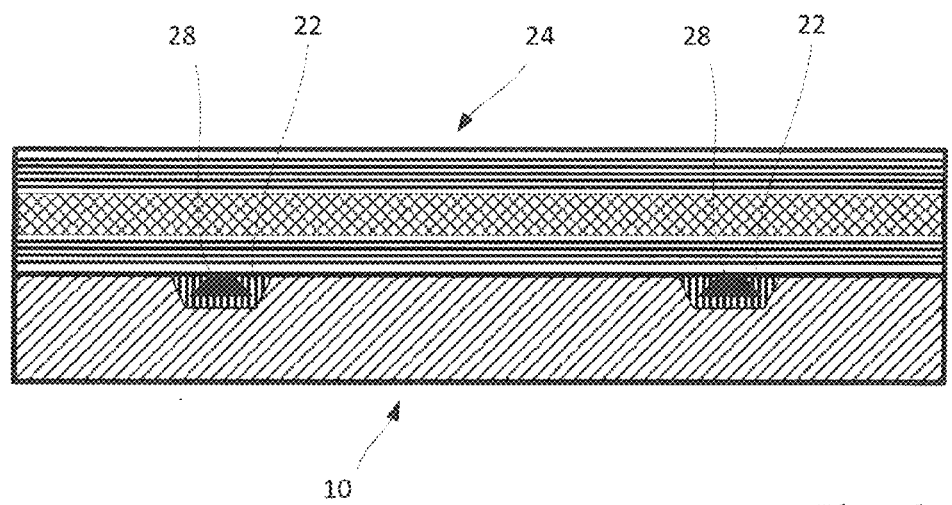
FIG. 3 is a schematic of a prefabricated structural element in a mold.

FIG. 3 shows the structural element 24 inserted into the mold 10. The prefabricated structural element possesses two positioning projections 28 via which it engages into corresponding positioning receptacles 22 in the mold 10. It is understood that further positioning projections can be arranged over the length of the structural element and further positioning receptacles can he arranged on the mold.

It is understood that the foregoing description is that of the preferred embodiments of the invention and that various changes and modifications may be made thereto without departing from the spirit and scope of the invention as defined in the appended claims.

LIST OF REFERENCE SYMBOLS USED

10 Mold
12 Suction side section
14 Trailing edge section
16 Edge
18 First inner side section
20 Second inner side section
22 Positioning receptacle
24 Prefabricated structural element
26 Outer surface
28 Positioning projection
30 Core
32 Fibrous material
34 Fastening section
36 Vacuum envelope
40 Cutout

What is claimed is:

1. A method for making a wind turbine member comprising the steps of:
   arranging a plurality of components of the wind turbine member in a mold having an inner side configured to determine a surface of the wind turbine member and the mold having a positioning receptacle disposed on the inner side thereof, at least one of the components being a prefabricated structural element having a fixed geometry with an outer surface;
   said prefabricated structural element forming an integral part of the wind turbine member;
   said prefabricated structural element having a positioning projection protruding out of the outer surface thereof so as to define an undercut with respect thereto;
   inserting the positioning projection into the positioning receptacle so as to permit said positioning receptacle to fill said undercut in a form tight manner to predetermine the disposition of the prefabricated structural element in the mold and to prevent relative movement between said prefabricated structural element and said mold in at least two spatial directions; and,
   interconnecting the components of the wind turbine member disposed in the mold.

2. The method of claim 1, further comprising the step of removing the positioning projection from the prefabricated structural element of the wind turbine member after the components have been interconnected in the mold.

3. The method of claim 1, wherein the outer surface of the prefabricated structural element bears against the inner surface of the mold in the predetermined arrangement.

4. The method of claim 1, wherein one of the components includes a fibrous material.

5. The method of claim 4, wherein the prefabricated structural element has an inner side and the fibrous material is arranged in the mold in such a manner that the fibrous material adjoins the inner side of the prefabricated structural element.

6. The method of claim 1 further comprising the steps of:
   closing the mold with the components including the prefabricated structural element arranged therein with a vacuum envelope; and,
   curing a liquid plastics material in the mold.

* * * * *

UNITED STATES PATENT AND TRADEMARK OFFICE
CERTIFICATE OF CORRECTION

PATENT NO. : 9,541,068 B2
APPLICATION NO. : 13/886038
DATED : January 10, 2017
INVENTOR(S) : D. Austinat et al.

It is certified that error appears in the above-identified patent and that said Letters Patent is hereby corrected as shown below:

On the Title Page
Item (57) Abstract Line 2: delete "Of" and insert -- of -- therefor.

In the Specification
In Column 1:
Line 26: delete "he" and insert -- the -- therefor.
Line 37: insert -- of -- after "result".
Line 39: delete "drive" and insert -- case -- therefor.
Line 53: delete "5" and insert -- 3 -- after "2011/003018".
Line 54: insert -- - -- between "nose side".
Line 66: delete "A1 in" and insert -- A1. In -- therefor.

In Column 2:
Line 2: insert -- case -- after "In this".
Line 5: delete "bolding" and insert -- holding -- therefor.
Line 8: insert -- is -- after "carried".
Line 20: delete "predefine" and insert -- predefines -- therefor.
Line 21: delete "connect" and insert -- connected to -- therefor.
Line 56: delete "project on" and insert -- projection -- therefor.
Line 60: delete "move" and insert -- movement -- therefor.
Line 63: insert -- the -- before "pre-".
Line 64: delete "arrange" and insert -- arrangement -- therefor.

In Column 3:
Line 48: insert -- the -- before "connection".
Line 55: insert -- and -- after "element,".
Line 57: insert -- , -- after "arrangement".
Line 63: insert -- to -- after "exactly".

Signed and Sealed this
Twentieth Day of June, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,541,068 B2

In Column 4:
Line 2: insert -- the -- before "fibrous".
Line 10: delete "this" and insert -- the -- therefor.
Line 21: insert -- cures -- before "in the mold".
Line 42: delete "the" and insert -- The -- therefor.
Line 42: insert -- serves -- after "element".

In Column 5:
Line 20: insert -- , -- after "element".
Line 20: insert -- , -- after "so that".
Line 37: delete "All" and insert -- An -- therefor.
Line 58: delete "at" and insert -- of -- therefor.
Line 61: insert -- cross -- before "section which".

In Column 6:
Line 27: insert -- a -- before "suction-side".
Line 55: delete "whist" and insert -- which -- therefor.
Line 66: delete "blade in" and insert -- blade. In -- therefor.

In Column 7:
Line 2: delete "4 flange" and insert -- a flange-like -- therefor.
Line 12: delete "plate" and insert -- plane -- therefor.
Line 28: delete "he" and insert -- be -- therefor.